(12) United States Patent
Medsker et al.

(10) Patent No.: US 6,855,775 B2
(45) Date of Patent: Feb. 15, 2005

(54) POLYMERIC BLOCKS OF AN OXETANE OLIGOMER, POLYMER OR COPOLYMER, CONTAINING ETHER SIDE CHAINS TERMINATED BY FLUORINATED ALIPHATIC GROUPS, AND HYDROCARBON POLYMERS OR COPOLYMERS

(75) Inventors: Robert E. Medsker, Hartville, OH (US); Richard R. Thomas, Stow, OH (US); Charles M. Kausch, Copley, OH (US); Raymond J. Weinert, Macedonia, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 136 days.

(21) Appl. No.: 10/015,734

(22) Filed: Dec. 13, 2001

(65) Prior Publication Data

US 2003/0166785 A1 Sep. 4, 2003

(51) Int. Cl.[7] .......................... C08L 71/02; C08L 75/08; C08G 65/08; C08G 65/18
(52) U.S. Cl. .................... 525/327.3; 525/410; 525/276; 525/118; 525/121; 525/199; 525/200; 525/312; 525/438; 525/444; 528/402
(58) Field of Search .............................. 525/327.3, 410, 525/276, 118, 121, 199, 200, 312, 438, 444; 528/402

(56) References Cited

U.S. PATENT DOCUMENTS

| | | | |
|---|---|---|---|
| 5,391,637 A | * | 2/1995 | Willis et al. |
| 5,405,911 A | * | 4/1995 | Handlin, Jr. et al. |
| 5,418,296 A | * | 5/1995 | Willis et al. |
| 5,468,841 A | * | 11/1995 | Malik et al. |
| 5,543,200 A | * | 8/1996 | Hardus et al. |
| 5,545,464 A | * | 8/1996 | Stokes |
| 5,560,992 A | * | 10/1996 | Sargent et al. |
| 5,576,095 A | * | 11/1996 | Ueda et al. |
| 5,637,772 A | * | 6/1997 | Malik et al. |
| 5,650,483 A | * | 7/1997 | Malik et al. |
| 5,654,450 A | * | 8/1997 | Malik et al. |
| 6,020,451 A | | 2/2000 | Fishback et al. |
| 6,127,517 A | | 10/2000 | Koike et al. |
| 6,383,651 B1 | * | 5/2002 | Weinert et al. ............. 428/482 |

* cited by examiner

Primary Examiner—James J. Seidleck
Assistant Examiner—Olga Asinovsky
(74) Attorney, Agent, or Firm—Arthur M. Reginelli; David G. Burleson

(57) ABSTRACT

A composition comprises an oxetane oligomer or polymer or copolymer block wherein each repeat group has at least one ether side chain which is terminated by a fluorinated aliphatic group and optionally with the proviso that at least two different repeat units of the oligomer or polymer or copolymer have different $R_f$ groups. The oxetane block is connected to a hydrocarbon polymer block derived from a mono or polyhydroxyl initiator. The terminal fluorinated alkyl groups impart good stain resistance to the oligomer or polymer or copolymer. In another embodiment, a fluorinated aliphatic or alkyl alcohol is reacted with an amino dicarboxylic acid with the reaction product thereof being subsequently grafted to a maleated polyolefin or a maleated polymer derived from a vinyl substituted aromatic monomer. The fluorinated alcohol also imparts good stain resistance to the grafted copolymer. Both compounds can be utilized as an additive in polymers as for example various polyolefins.

43 Claims, No Drawings

POLYMERIC BLOCKS OF AN OXETANE OLIGOMER, POLYMER OR COPOLYMER, CONTAINING ETHER SIDE CHAINS TERMINATED BY FLUORINATED ALIPHATIC GROUPS, AND HYDROCARBON POLYMERS OR COPOLYMERS

FIELD OF THE INVENTION

The present invention relates to an oxetane oligomer or polymer or copolymer block the repeat groups of which contain ether side chains terminated by the same or different types of fluorine containing alkyl groups. In the latter situation, the oligomer, polymer, or copolymer is derived from a mixture of oxetane monomers having ether side chains wherein different monomers are terminated by different fluorine containing aliphatic groups. The oxetane block is made utilizing a mono or polyhydroxyl hydrocarbon polymer or copolymer initiator which results in the formation of the oxetane block connected to the hydrocarbon block. In an other embodiment, a fluorinated aliphatic or alkyl alcohol is reacted with an amino dicarboxylic acid and the reaction product thereof is subsequently grafted to a maleated polyolefin or a maleated polymer derived from a vinyl substituted aromatic monomer. Such compositions are useful as melt additives for various polymers such as polyolefins.

BACKGROUND OF THE INVENTION

Fluorochemicals, typically, have relatively low surface tensions. Therefore, water and other common liquids tend to have a relatively high contact angle or "bead" when resting upon a fluorochemical surface. Fluorochemicals are, hence, referred to as repellents since they are not wetted by these fluids. Many commercially important fibers, fabrics, surfaces and materials are wetted by water and other common fluids. This wetting leads to unwanted effects such as water passing through an umbrella or coat or staining of a fabric by a liquid. It is desirable commercially to make these items repellent to water and/or common liquids. In practice, this is accomplished usually by topical application of a waterborne fluorochemical emulsion or dispersion. This technology has been practiced successfully for many years. Topical application of a water-borne repellent system has several disadvantages: (i) water must be removed in order for the repellent to work properly. The presence of water imparts a high thermal and time load on the manufacture of finished goods. Often, removal of water is the rate-limiting operation in the manufacture of goods containing repellents. The high temperatures and high heat of vaporization required to remove water introduce large energy and equipment costs in manufacturing. Heating must be done carefully as to not exceed the deflection temperature of a given fabric, fiber or material; (ii) there is a shift of fabrics to smaller deniers. This increases dramatically the surface area that needs to be coated by a fluorochemical repellent. The cost associated with providing repellency increases with decreasing fiber denier; (iii) the increased use of polyolefins has introduced challenges to topical application of water-borne fluorochemicals. Polyolefins, generally, have much lower surface tensions than materials used extensively in the past such as nylon. Successful application of a water-borne repellent package requires that the system wet the fiber in order to coat a substantial fraction of the surface. Water will not wet polyolefins well; therefore, surfactants are used to lower the surface tension of water such that it will wet the polyolefin. However, these surfactants remain with the fluorochemical coating and can raise the surface tension of the final repellent package. This is very detrimental to the performance of the fluorochemical as a repellent; (iv) topical application of a fluorochemical repellent introduces unit operations into fabrication of finished goods and, therefore, increases manufacturing costs; and (v) topical fluorochemical treatment produces a relatively thick coating of repellent on a surface.

SUMMARY OF THE INVENTION

Various oligomer, polymer, and copolymer oxetanes are described the repeat units of which have an ether side chain which in turn is end capped or terminated with a fluorinated aliphatic ($R_f$). Within the same oxetane oligomer or polymer, or copolymer, generally the same fluorinated aliphatic groups and desirably alkyl groups exist having from about 1 to about 20 carbon atoms. Alternatively, the oxetane oligomer, polymer or copolymer can have repeat units wherein different repeat units are terminated by at least two different types of fluorinated alkyl groups having from about 2 to about 30 carbon atoms. The repeat units containing different fluorinated alkyl groups are statistically arranged throughout the oligomer or polymer or copolymer. Regardless of the $R_f$ embodiment, at least 50 percent of the hydrogen atoms have been replaced by a fluorine atom. Preferably, the fluorinated alkyl groups are perfluorinated.

The oxetane oligomers, or polymers, or copolymers having the same, or a plurality of different $R_f$ groups are derived from a mono or polyhydroxyl hydrocarbon polymer or copolymer initiators which results in the formation of an oxetane block connected to a hydrocarbon block.

In another embodiment, a fluorinated aliphatic or alkyl alcohol can be reacted with an amino dicarboxcyclic acid and the reaction product thereof is subsequently grafted onto maleated polyolefins or onto maleated polymers derived from vinyl substituted aromatic monomers.

Inasmuch as the fluorinated compounds are stain resistant, the block copolymers thereof or the maleated grafted copolymers, can be utilized in various polymers such as polyolefins to improve such properties thereof. Since the block copolymer can be solid, they are advantageously blended with other polymers as by forming a master batch and/or coextruding.

DETAILED DESCRIPTION OF THE INVENTION

The fluorinated thermoplastics of the present invention are derived from monomers having pendant ether side chains which in turn are terminated by a $R_f$ group. The monomers can either have substantially the same $R_f$ group, or there can be a mixture of monomers containing different $R_f$ groups having different numbers of carbon atoms which are generally of an even number. The oxetane monomers generally have the structure as set forth in Formula I Formula I

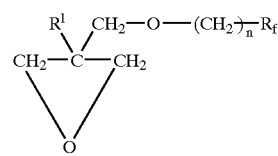

1A or

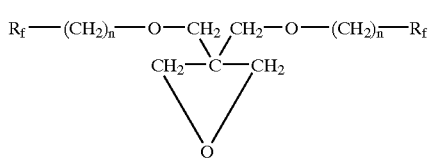

wherein n, independently, is an integer of from 1 to about 6, desirably from 1 to about 4, and preferably 1 or 2, and where an $R^l$ is an alkyl having from 1 to 6 carbon atoms or hydrogen with methyl being preferred.

When the monomers all contain substantially the same $R_f$ group (that is generally only 5, 3, or 1 percent or less by weight of the monomers have a different number of carbon atoms), the $R_f$ group is a fluorinated aliphatic and desirably a linear alkyl group having from 1 to about 20 carbon atoms, desirably from about 3 to about 15 and preferably from about 6 to about 10 carbon atoms. When individual monomers contain different $R_f$ groups, the $R_f$ groups are a fluorinated aliphatic, desirably independently, linear or branched, alkyl groups having from about 2 or 4 to about 24 or 30 carbon atoms, desirably from about 6 to about 20 carbon atoms, and preferably from about 8 to about 16 carbon atoms. Whether a plurality of oxetane monomers all contain substantially, or the same $R_f$ end group, or contain different $R_f$ end groups, each $R_f$ group, independently, generally contains at least 50 percent, desirably at least 75 or 90 percent and preferably at least 95 percent of the hydrogen atoms of the aliphatic or alkyl group replaced by a fluorine atom. Most preferably $R_f$ is a perfluorinated alkyl group. Optionally, from one to all of any remaining hydrogen atoms can be replaced by I, Cl, or Br, or combinations thereof.

The individual oxetane monomers of the present invention are generally the same except for different $R_f$ groups inasmuch as they are prepared from either the same fluorinated aliphatic or alkyl alcohol, or a mixture of different fluorinated aliphatic or alkyl alcohols. Such alkyl alcohols can generally be represented by the formula A $$X\text{—}(CX^1X^2)_m\text{—}(CH_2)_n\text{—}OH \quad \text{Formula A}$$

wherein X is H or F, preferably F, wherein $X^1$, independently, is H or F for each repeat unit, preferably F, wherein $X^2$, independently, is H or F for each repeat unit, preferably F, with the proviso that at least one of said X, said $X^1$ or said $X^2$ is F; wherein m is from 2 to about 30, desirably from 4 to about 24, and preferably from about 6 to about 20 or about 8 to about 16, wherein m is often an even number, and wherein n is from 1 to about 6, desirably 1 or about 4, and preferably 1 or 2. Preferred compounds are thus perfluorinated alkyl methanol or ethanol. Such fluoroalcohols are often based upon various tetrafluoroethylene based telomer fluoroalcohols such as those commercially available from Dupont as Zonyl, from Clariant as Fluowet, from Elf-Atochem as Foralkyl 6HN, and from Daikin as StFA.

The above oxetane monomers, whether $R_f$ is the same or different, are generally prepared by reaction of the above noted fluoroalcohol with a halogenalkyl-3-alkyloxetane wherein the first "alkyl" group is represented by "n" and the second "alkyl" group is represented by $R^l$ in formula 1A, in the presence of an alkali metal crown compound and a solvent with subsequent addition of an alkali hydroxide such as potassium hydroxide, sodium hydroxide, or the like. The general reaction of the fluorinated alcohol with the oxetane compound is described in U.S. Pat. No. 5,807,977 to Malik, U.S. Pat. No. 5,650,483 to Malik, U.S. Pat. No. 5,668,250 to Malik and U.S. Pat. No. 5,668,251 to Malik, all of which are hereby fully incorporated by reference. Specific examples of the oxetane compound include 3-bromomethyl-3-methyloxetane or 3-iodomethyl-3-methyloxetane. The mixture of the fluoroalcohols with the oxetane compound is generally heated to a reaction temperature of from about 75° C. to about 100° C. and preferably from about 80° C. to about 95° C. The alkali metal crown compound such as potassium 18-crown-6 is contained in the mixture along with the solvent and heated to the indicated temperature. Subsequently the alkali hydroxide is generally added in increments while maintaining the reaction temperature. In order to eliminate water which is formed during the reaction, a Dean-stark trap can be utilized operating at temperature of from about 95° C. to 110° C. The presence of the crown compound increases the yield of the resulting monomer so that it is generally at least 70 percent, generally at least 80 percent, and preferably at least 90 percent. As known to the art, the alkali metal of the crown compound contains an alkali metal which can be potassium, sodium, or lithium and specific compounds include potassium 18-crown-6 which is preferred, sodium 15-crown-5, lithium 12-crown-4, and the like wherein the first number represents the total number of carbon and oxygen atoms whereas the second number represents only the total number of oxygen atoms in the compound. Generally the total number of carbon and oxygen atoms can range from about 10 to about 20 whereas the total number of only oxygen atoms can range from about 3 to about 8. The amount of said crown compound is generally from about 1 to about 15 percent by weight and desirably from about 1.0 or 1.5 to about 12 percent by weight and preferably from about 5 to about 10 percent by weight based upon the total weight of the halogenalkyl-alkyloxetane compound. The solvents include various fluoro solvents such as benzotrifluoride, or various hydrocarbon solvents such as various alkane, or aromatic solvents with specific examples including hexane, heptane, toluene, and the like.

When the fluoroalcohol utilized is a mixture of various different alcohols, the monomers will generally have the structure of Formula 1 with different monomers having a different number of carbon atoms in the $R_f$ group such as $C_8F_{17}$, $C_{10}F_{21}$, $C_{12}F_{25}$, $C_{14}F_{29}$, $C_{16}F_{33}$, and the like. The amount of the different $R_f$ groups will naturally generally vary with the amount of different types of fluorinated alcohols utilized in the fluorinated alcohol mixture.

When the monomer is that as shown by Formula 1B, such monomers are commercially available from CIBA-GIEGY. These monomers can be made according to a manner as set forth in U.S. Pat. Nos. 4,946,992, 4,898,981 and 5,097,048, assigned to CIBA-GIEGY, and hereby fully incorporated by reference. Alternatively, such monomers containing two $R_f$ end capped ether side chains can be made in a manner similar to that set forth above with regard to the preparation of the monomers shown in Formula 1A wherein a bis (bromoalkyl)oxetane is utilized wherein the n alkyl group is the same as set forth above, that is it can have from 1 to 6 carbon atoms, desirably from 1 to 4 carbon atoms, and preferably 1 or 2 carbon atoms.

A specific example of the preparation of the monomers of the present invention is as follows:

EXAMPLE M1

Synthesis of oxetane-mixed $R_f$ monomer

| Material | Weight G | MW | mmoles | Mole Ratio |
|---|---|---|---|---|
| Daikin StFA | 1500.00 | 495 | 3030.30 | 1.00 |
| BrMMO* | 525.35 | 165.02 | 3183.55 | 1.05 |
| 18-crown-6 | 37.50 | 322.37 | 116.33 | 0.038 |
| KOH (86%) | 217.44 | 56.11 | 3332.74 | 1.10 |
| Benzotrifluoride | 1789.45 | 146.11 | 12247.28 | 4.04 |
| 10% sulfuric acid | 923.55 | 53.45 | 863.94 | 0.29 |
| Water | 1200 | 18.01 | 48981.12 | 16.16 |

| | |
|---|---|
| Water Amount, grams | 241.58 |
| Theoretical Yield, (g) | 1049.2 |
| Expected Yield, low (g) | 786.9 |
| Expected Yield, high (g) | 996.8 |
| Solids Loading, % | 46.0 |

| | mL |
|---|---|
| Volume after KOH addn. | 2,902.4 |
| Volume after quench | 3802.1 |
| Volume after phase split | 1248.5 |
| Volume after wash | 2130.6 |

*3-bromomethyl-3-methyloxetane

Daikin StFA is a mixture of fluoroalcohols as follows:

| Alcohol | Approximate Weight % of StFA Sample |
|---|---|
| $C_{10}F_{21}CH=CH_2$ | 2.6 |
| $C_{12}F_{25}CH=CH_2$ | 1.7 |
| $C_8HF_{17}C_2H_4OH$ | 50.6 |
| $C_{10}F_{21}C_2H_4OH$ | 23.5 |
| $C_{12}F_{25}C_2H_4OH$ | 9.3 |
| $C_{14}F_{29}C_2H_4OH$ | 8.4 |
| Miscellaneous Alcohols | 3.9 |

A 2 liter three necked round bottomed flask was equipped with a mechanical stirrer, temperature probe, and heating mantle. The reactor was charged with StFA from Daikin (1,500 grams, 3.03 moles), 3-bromomethyl-3-methyl oxetane (525.35 grams, 3.183 moles), 18-crown-6 (37.5 grams), and 1789 grams of benzotrifluoride was added and allowed to heat to 85° C. Ground solid potassium hydroxide (217.44 grams, 3.33 moles) was added in 11 increments over 90 minutes maintaining a temperature of about 85° C. to about 92° C. Conversion was determined to be 90 percent by NMR. An additional 13.18 grams of ground potassium hydroxide was added, and the reaction was allowed to stir for one hour. The reaction mixture was quenched with deionized water, and the organic layer was washed with 10 percent sulfuric acid. A low boiling fraction was removed under vacuum at 28 inches of mercury with a head temperature of 65° C. to 130° C. 1522.6 grams of monomer was isolated (87 percent yield).

Example M2 relates to the preparation of oxetane monomers containing mixed $R_f$ groups obtained from Clariant.

EXAMPLE M2

Synthesis of oxetane-mixed $R_f$ monomer

| Material | Weight G | MW | mmoles | Mole Ratio |
|---|---|---|---|---|
| Fluowet ea-812-ac | 1500.00 | 495 | 3030.30 | 1.00 |
| BrMMO | 525.35 | 165.02 | 3183.55 | 1.05 |
| 18-crown-6 | 37.50 | 322.37 | 116.33 | 0.038 |
| KOH(86%) | 217.44 | 56.11 | 3332.74 | 1.10 |
| Benzotrifluoride | 1789.45 | 146.11 | 12247.28 | 4.04 |
| 5% Ammonium Chloride | 923.55 | 53.45 | 863.94 | 0.29 |
| Water | 1200.00 | 18.01 | 66629.65 | 21.99 |

| | |
|---|---|
| Water Amount, grams | 241.58 |
| Theoretical Yield, (g) | 1049.2 |
| Expected Yield, low (g) | 786.9 |
| Expected Yield, high (g) | 996.8 |
| Solids Loading, % | 46.0 |

Fluowet ea-812-ac is a mixture of fluoroalcohols from Clariant as follows:

| Alcohol | Approximate Weight % of Fluowet ea-812-ac Sample |
|---|---|
| $C_{10}F_{21}CH=CH_2$ | 2.3 |
| $C_{12}F_{25}CH=CH_2$ | 1.7 |
| $C_8HF_{17}C_2H_4OH$ | 50.0 |
| $C_{10}F_{21}C_2H_4OH$ | 23.2 |
| $C_{12}F_{25}C_2H_4OH$ | 9.2 |
| $C_{14}F_{29}C_2H_4OH$ | 8.3 |
| Miscellaneous Alcohols | 5.3 |

A 4 liter jacketed four necked round bottomed flask was equipped with a mechanical stirrer, temperature probe, and a reflux condenser equipped with a Dean-stark trap. The reactor was charged with fluowet ea-812-ac (1,500 grams, 3.03 moles), 3-bromomethyl-3-methyl oxetane (525.35 grams, 3.183 moles), 18-crown-6 (37.5 grams), and 1789 grams of benzotrifluoride was added and allowed to heat to 85° C. Ground solid potassium hydroxide (217.44 grams, 3.33 moles) was added in 11 increments over 90 minutes maintaining a temperature of 85° C.–92° C. Conversion was determined to be 90% by NMR. The reaction was heated to 95° C. and a mixture of benzotrifluoride and water was removed using the Dean-stark trap. An additional 20.00 grams of ground potassium hydroxide was added, and the reaction was allowed to stir for 1 hour. The reaction mixture was quenched with deionized water, and the organic layer was washed with 10% sulfuric acid. A low boiling fraction was removed under vacuum at 28 inches of mercury with a head temperature of 65° C.–130° C. 1522.6 grams of monomer was isolated (87 percent yield).

Example M3 relates to preparation of oxetane monomers having two ether $R_f$ terminated side chains.

EXAMPLE M3

Synthesis of Oxetane bis(same) $R_f$ monomer

| Substance | Weight G | MW | mmoles |
|---|---|---|---|
| Cheminox fa-8 | 100.00 | 461.1 | 216.87 |
| BBrMMO | 27.77 | 243.92 | 113.86 |

-continued

Synthesis of Oxetane bis(same) $R_f$ monomer

| | | | |
|---|---|---|---|
| 18-crown-6 | 2.50 | | |
| Benzotrifluoride | 102.98 | 146.11 | 704.84 |
| KOH(86%) | 15.56 | 56.11 | 238.56 |
| KOH | 5.68 | 56.11 | — |
| KOH | 5.68 | 56.11 | — |
| 10% $H_2SO_4$ | 69.56 | 53.46 | 1,301.24 |
| Theoretical Yield, g | | 125.57 | |
| Expected Yield (85%) | | 105.48 | |
| Solids Loading (%) | | 71.67% | |

| | mL |
|---|---|
| Initial Volume | 175.21 |
| Total Water | 2.18 |
| Volume + Quench | 245.09 |
| Volume + Wash | 150.33 |

Cheminox fa-8 is approximately 97 percent by weight of $C_8F_{17}C_2H_4OH$ and approximately 1.8 percent by weight $C_{10}F_{21}C_2H_4OH$ from Nippon Mektron of Japan.

A 250 milliliter three necked round bottomed flask was equipped with a magnetic stirrer, temperature probe, reflux condenser equipped with a dean-stark trap. The reactor was charged with Cheminox fa-8 (100 grams, 0.216 moles), 3,3'-bis(bromomethyl)oxetane (27.77 grams, 0.113 moles), 18-crown-6 (2.5 grams), and 103 grams of benzotrifluoride was added and allowed to heat to 85° C. Ground solid potassium hydroxide (15.56 grams, 3.33 moles) was added in 11 increments over 90 minutes maintaining a temperature of 85° C.–92° C. Conversion was determined to be approximately 60 percent by NMR. The reaction was heated to 95° C. and a mixture of benzotrifluoride and water was removed using the Dean-stark trap. An additional 5.68 grams of ground potassium hydroxide was added, and the reaction was allowed to stir for 12 hours at 85° C. The reaction mixture was filtered to remove wet KBr, and returned to the reaction vessel, and heated to 85° C. An additional 5.68 gr KOH was added, and the reaction was allowed to stir at 95° C. for 24 hours. The reaction mixture was washed with 10 percent sulfuric acid, dried, and the solvent was removed. A low boiling fraction was removed under vacuum at 28 inches of mercury with a head temperature of 65° C.–130° C., 66.19 grams of monomer was isolated (58 percent yield).

The 3,3'-bis(bromomethyl)oxetane of Example M3 was prepared in the following manner:

EXAMPLE M3 (BBrMMO)

Synthesis of 3,3'-bisbromomethyloxetane

| Substance | Weight G | MW | Moles |
|---|---|---|---|
| tribromoneopentyl alcohol | 500 | 324.84 | 1.54 |
| water | 288.50 | 18.01 | 16.02 |
| tetrabutyl ammonium bromide | 12.40 | 322.37 | 0.04 |
| 45% KOH | 211.12 | 56.11 | 1.69 |
| di water quench | 500 | 18.01 | 27.76 |
| theoretical yield | | 375.46 | |
| Yield, Max | | 356.69 | |
| Yield, Min | | 281.60 | |

-continued

Synthesis of 3,3'-bisbromomethyloxetane

| | mL |
|---|---|
| Vol after KOH addition | 664.90 |
| Vol after Quench | 1164.90 |

*Tribomoneopentyl alcohol used in this synthesis was purchased from Ameribrom, Inc. of Fort Lee, NJ.

A jacketed 3-necked round bottomed flask equipped with a temperature probe, reflux condenser, and addition funnel was heated to 85° C. Tribromoneopentyl alcohol (500 grams, 1.54 moles), and a solution of tetrabutyl ammonium bromide (12.40 grams, 0.04 moles) in deionized water (288.5 grams) were added. A 45 percent solution of potassium hydroxide in water (211.12 grams, 1.69 moles) was added over 45 minutes. The reaction was allowed to stir for 2 hours. The reaction was quenched with 500 grams of water, and the water layer was removed. The product was distilled at 151° C. at 28 inches of vacuum giving 239.83 grams or 64 percent.

Monohydroxyl or polyhydroxyl terminated hydrocarbon polymer or copolymer initiators are utilized to polymerize the above-noted monomers whether they contain the same $R_f$ group, or whether they contain a mixture of different $R_f$ groups. Such initiators generally include mono or polyhydroxyl terminated olefin polymers or copolymers, or mono or polyhydroxyl terminated hydrogenated diene polymers, or copolymers, and the like. The block copolymers are of the type AB or ABA where A represents the oxetane block and B represents the hydrocarbon block.

A desirable class of mono or polyhydroxyl initiators are the various polyhydroxyl terminated olefin polymers or copolymers. These initiators are made from olefins generally having from 2 to 6 or 8 carbon atoms and preferably 2 or 3 carbon atoms. Examples of specific olefin monomers include ethylene, propylene, butylene and isobutylene, and the like. Preferred copolymers are those made from ethylene and propylene monomers. These polymers or copolymers are terminated with one or more hydroxyl groups as known to the literature and to those skilled in the art. Examples of specific preferred initiator compounds include polyethylene glycol, polypropylene glycol, a copolymer of ethylene and propylene having two terminated hydroxyl groups, and the like. The number average of molecular weight of such initiators is generally from about 200 or 400 to about 4,000.

Another class of suitable initiators are polymers and copolymers of various hydrogenated dienes which are mono or polyhydroxyl terminated. Such polymers, as well as the preparation thereof, are known to the art and to the literature. Typical diene polymers or copolymers are made from one or more conjugated dienes, having from 4 to 10 carbon atoms, such as 1,3-butadiene, isoprene, dimethyl butadiene, and the like. The polymerization of the diene monomer, typically, is via anionic initiation (e.g. with di-lithium hydrocarbyl initiators) or via free-radical polymerization, e.g. by initiation with hydrogen peroxide, which also introduces hydroxy end groups. In case of anionic polymerization, OH-end groups are advantageously introduced by reaction of the polymeric carbanion chain ends with ethylene oxide. These techniques are generally well known to the literature. The hydroxy-functional polydienes are generally hydrogenated, for example, partially or substantially (i.e., at least 50, 70, or 90 percent of the unsaturated sites), and even completely hydrogenated, according to any conventional method known to the art and to the literature. Complete hydrogenation of various diene polymers such as 1,4-polyisoprene is equivalent to an alternating ethylene/propylene hydrocarbon polymer. The hydrocarbon polymers generally have a number average molecular weight from about 500 to 15,000 and preferably from about 1,000 to about 8,000. The polymers are desirably liquid at room temperature, but can have a melting point up to about 80° C. Preferred polymers are hydroxyl functional telechelic, hydrogenated diene polymers containing 2 to 6 and preferably 2 to 4 hydroxy end groups per polymeric molecule (polymer unit).

An especially preferred hydrogenated butadiene polymer or copolymer is commercially available as Polytail H and Polytail HA sold by Mitsubishi Kasei Corp., and has the very generalized structure:

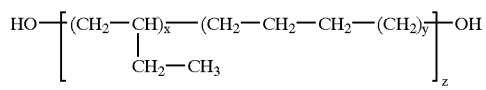

wherein X and Y are randomly distributed and the structure can contain additional —OH groups. In Polytail H, x is generally about 2 and y is about 8, whereas in Polytail HA, x is about 9 and y is about 1. Thus, the ratio of the two groups to one another can range from about 0.10 to about 10 of the branch repeat group (x) per one linear repeat group (y). Z is from about 1 to about 10 and desirably from about 2 to 4.

Inasmuch as the above initiators are a polymer or a copolymer, they form a block copolymer when reacted with an oxetane oligomer, polymer, or copolymer block.

The above noted oxetane monomers having the same $R_f$ groups or a mixture of different $R_f$ groups are reacted in the presence of the above mono or polyhydroxyl hydrocarbon polymer or copolymer initiators to produce an oxetane oligomer, polymer, or copolymer block chemically connected to the mono or polyhydroxyl hydrocarbon polymer or copolymer initiator block. Such a block copolymer has at least one oxetane block portion generally represented by Formulas 2A and 2B with the overall block copolymer often represented by the structure as set forth in Formulas 3A and 3B when the initiator is a diol hydrocarbon polymer or copolymer.

wherein $R^I$ and n is the same as set forth above and DP is from about 2 to about 100, desirably from about 3 to about 50, and preferably from about 3, or 4, or 5 to about 15, or 20, or 30. It is to be understood that the above structures of Formula 3 are only representative in that the initiator can also contain 1, or 3 or 4 hydroxyl groups, and the like. When the oxetane oligomer, polymer, or copolymer of Formulas 2A and 2B contain different $R_f$ groups within the various repeat units thereof, the amount of each particular type of $R_f$ repeat unit can vary considerably as from about 1, 3, or 5 to 95, 97 or 99 percent and desirably from about 8 or 10 to about 50 or 60 percent by weight based upon the total weight of all the different $R_f$ repeat units in the oxetane oligomer, polymer, or copolymer.

Formula 4 sets forth a particular representation of a fluorinated oxetane block having repeat units containing different terminal $R_f$ groups such as $C_8F_{17}$, $C_{10}F_{21}$, $C_{12}F_{25}$, and $C_{14}F_{29}$.

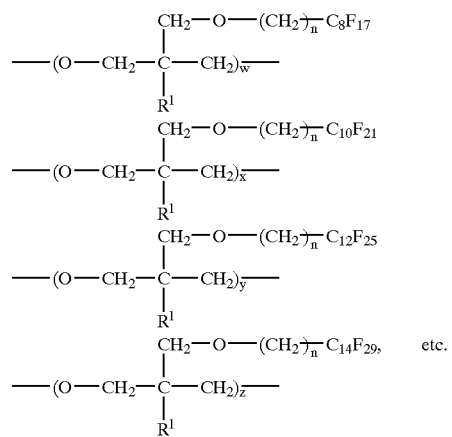

Formula 4 wherein $R^I$ and n are the same as set forth herein above or $R^I$, independently, is a pendent group the same as set forth in the top portion of the formula, e.g. —CH$_2$—O—(CH$_2$)$_n$C$_8$F$_{17}$, etc. Inasmuch as the oligomer, polymer, or copolymer block is a statistical entity, the order and length of the various different units will of course vary statistically

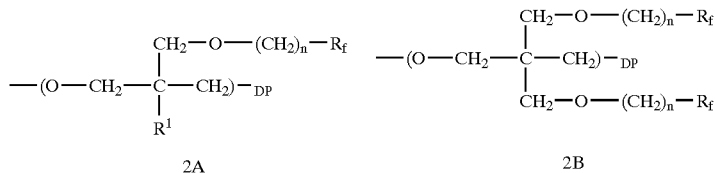

Formula 2

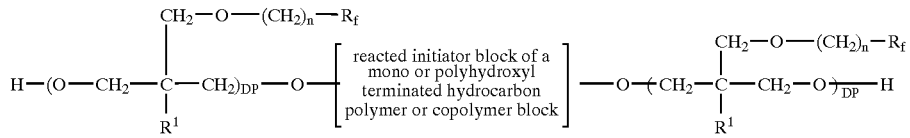

Formula 3A

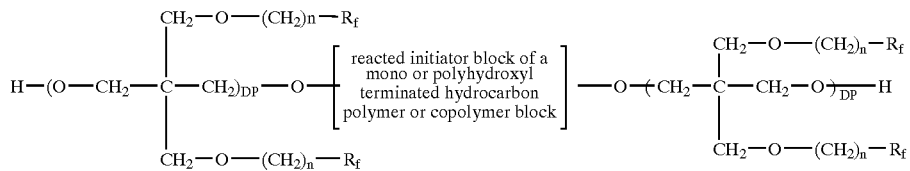

Formula 3B throughout the entity. Accordingly, the number of repeat units with respect to w, x, y, and z can vary throughout the polymer, copolymer, etc., and can be 1 or greater with many different such repeat groups existing either singularly or in large amounts.

In a current preferred embodiment, i.e. the use of Daikin StFA fluoroalcohols, the total amount of "w" repeat units which contain a $C_8F_{17}$ $R_f$ group is generally from about 20 to about 80 percent by weight and preferably from about 35 to about 65 percent by weight based upon the total weight of the polyoxetane block per se (i.e. without any non-oxetane polymer). The total number of x repeat units containing a $C_{10}F_{21}$ $R_f$ group is approximately 10 to 50 percent and desirably from about 15 to 35 percent by weight based upon the total weight of the polyoxetane per se. The total number of repeat units y containing $C_{12}F_{25}$ $R_f$ groups and the number of z repeat units containing $C_{14}F_{29}$ $R_f$ groups are generally about the same and range from about 2 or 3 to about 25 percent and desirably from about 5 to 20 percent weight percent based upon the total weight of the polyoxetane per se.

The preparation of the polyoxetane block from the above-noted oxetane monomers can generally be formed in the manner as set forth in U.S. Pat. Nos. 5,807,977; 5,668,250; 5,668,251; and 5,650,483, which are hereby fully incorporated by reference. Generally, the mixtures of monomers and the desired mono or polyhydroxyl hydrocarbon polymer or copolymer initiator are added to vessel along with a suitable catalyst such as boron trifluoride. Since this compound is a gas, it is generally utilized in the form of a complex with a cyclic oxygen compound such as THF so that it is in the form of a liquid. Suitable reaction temperatures generally range from about 15° C. to about 80° C., 20° C. to about 70° C., with from about 25° C. to 50° C. being preferred. The reaction temperature ranges are higher for the bis mixed monomer and generally range from about 30° C. to about 100° C. and preferably from about 60° C. to about 90° C. The THF will also react with the oxetane monomers and form a statistical copolymer thereof. The amount of THF is small, i.e. generally less than 5 percent, and desirably less than 3 percent by weight based upon the total weight of the statistical copolymer. Various alkyl glycidyl ethers can be utilized to prevent cyclic formation within the polymers. The alkyl component of the glycidyl ether generally has from about 4 to about 10 carbon atoms with about 4 carbon atoms being preferred.

The solvent utilized is generally the same as the solvent utilized for the monomer formation and hence includes fluorosolvents and hydrocarbon solvents such as benzotrifluoride, toluene, methylene dichloride, and the like. The amount of the solvent is such that the formed composition generally contains from about 50 to about 90 percent by weight of solvent and hence from about 10 to about 50 percent by weight of solids containing the above noted block copolymers such as set forth in Formulas 3A and 3B.

The following examples will serve to illustrate but not to limit the preparation of the block copolymers of the present invention.

EXAMPLE 1

| Synthesis of PolyFOX-Polytail H-PolyFOX Triblock, Total DP 6 | | | |
|---|---|---|---|
| Compound | Weight G | MW | Moles | Mole Ratio |
| polytail H | 100.746 | 2800.00 | 0.04 | 2.50 |
| $BF_3 \cdot THF$ | 2.013 | 139.90 | 0.01 | 1.00 |

-continued

| Synthesis of PolyFOX-Polytail H-PolyFOX Triblock, Total DP 6 | | | |
|---|---|---|---|
| Benzotrifluoride | 150.000 | 146.00 | — | — |
| Toluene | 150.000 | 92.14 | 1.63 | 113.17 |
| mixed $R_f$ Monomer (Ex. M2) | 125.000 | 579.00 | 0.22 | 15.01 |
| Heloxy 61* | 1.619 | 150.00 | 0.01 | 0.30 |
| Benzofluoride | 200.000 | — | — | — |
| Water | 53.750 | 18.01 | 2.98 | 207.47 |
| Water | 106.250 | 18.01 | 5.90 | 410.11 |
| Theoretical Yield (g) | | | 226.78 | |
| Expected Yield, Low (g) | | | 204.11 | |
| Expected Yield, High (g) | | | 215.44 | |
| Solids Loading Reaction, % | | | 60.29 | |
| Solids Loading Wash, % | | | 31.30 | |

*Heloxy 61 is a mixture of $C_8$ to $C_{10}$ alkyl glycidyl ethers.

A 500 milliliter 3-necked round bottomed flask was equipped with a condenser, temperature probe, magnetic stirrer, addition funnel, and water cooling bath. Polytail H (100.75 grams, 0.0414 moles), $BF_3$·THF (2.013 grams, 0.014 moles), 150 g of benzotrifluoride, and 150 g of toluene were added and allowed to stir for 30 minutes at 30° C. A solution of mixed $R_f$ monomers from Example M2 (125 grams, 0.22 moles) and Heloxy 61 (1.619 grams, 0.0108 moles) in 200 grams of benzotrifluoride was prepared. The mixed monomer solution was added to the reactor over 1 hour. An exotherm was observed increasing the temperature to 43° C. The reaction was allowed to stir at 25° C. for 10 hours. The reaction was quenched with 1,185 grams of 5 percent sodium bicarbonate. The organic layer could not be separated, so the solvent was removed under reduced pressure. A yield of 208 grams of polymer with a degree of polymerization of 6 was observed. A triblock copolymer was formed with polytail H having the structure (fluorinated oxetane-THF)-Polytail H-(fluorinated oxetane-THF).

EXAMPLE 2

| Poly-5-Fox-polytail H-Poly-5-Fox Triblock, Total DP 23 | | | |
|---|---|---|---|
| Compound | Weight G | MW | Moles | Mole Ratio |
| polytail H | 179.364 | 2800.00 | 0.06 | 2.50 |
| $BF_3 \cdot THF$ | 3.585 | 139.90 | 0.03 | 1.00 |
| Benzotrifluoride | 480.000 | 146.11 | 3.29 | 128.21 |
| Toluene | 237.000 | 95.17 | 2.49 | 97.19 |
| 5-fox monomer | 300.00 | 234.16 | 1.28 | 50.00 |
| 5% sodium bicarbonate | 129.000 | 18.01 | 7.16 | 279.54 |
| Water | 255.000 | 18.01 | 14.16 | 552.58 |
| Theoretical Yield (g) | | | 481.21 | |
| Expected Yield, Low (g) | | | 433.09 | |
| Expected Yield, High (g) | | | 457.15 | |
| Solids Loading Reaction, % | | | 67.08 | |
| Solids Loading Wash, % | | | 40.25 | |

A 1000 milliliter 3-necked round bottomed flask was equipped with a dondenser, temperature probe, magnetic stirrer, addition funnel, and Heating Mantle. Polytail H (179.36 grams, 0.0640 moles), $BF_3$.THF (3.59 grams, 0.0257 moles), 480 g of benzotrifluoride, and 237 g of toluene were added and allowed to stir for 30 minutes at 68° C. 5-fox monomer from OMNOVA Solutions of Mogadore, Ohio (300 grams, 1.28 moles) was added to the reactor over 1 hour. An exotherm was observed increasing the temperature to 75° C. The reaction was allowed to stir at 68° C. for 10 hours. The reaction was quenched with 129 grams of 5 percent sodium bicarbonate. The organic layer could not be separated, so the solvent was removed under reduced pressure. A yield of 457 grams of a statistical oxetane-THF copolymer with a total degree of polymerization of 23 was observed. A triblock copolymer with polytail H was formed having the structure (fluorinated oxetane-THF)-Polytail H-(fluorinated oxetane-THF).

EXAMPLE 3

Synthesis of bis-FOX-polytail H-Bis-Fox Triblock, Total DP6

| Compound | Weight G | MW | Moles | Mole Ratio |
|---|---|---|---|---|
| polytail H | 46.467 | 2800.00 | 0.0166 | 2.50 |
| $BF_3 \cdot THF$ | 2.013 | 139.9 | 0.014 | — |
| benzotrifluoride | 160.000 | 146.11 | 1.10 | 164.97 |
| bis FOX monomer (Ex. M3) | 100.000 | 1004.30 | 0.10 | 15.00 |
| Heloxy 61 | 0.747 | 150.00 | 0.0050 | 0.75 |
| Benzotrifluoride | 80.000 | 146.11 | 0.5475 | 82.48 |
| 5% Sodium bicarbonate | 43.000 | 84.01 | 0.03 | 3.86 |
| Theoretical Yield (g) | | | 146.95 | |
| Expected Yield, Low (g) | | | 132.25 | |
| Expected Yield, High (g) | | | 139.60 | |
| Solids Loading Reaction, % | | | 64.82 | |
| Solids Loading Wash, % | | | 38.05 | |
| | | | ml | |
| Initial Volume | | | 193.10 | |
| Solution density before wash | | | 1.18 | |
| Volume after quench, ml | | | 371.12 | |
| Volume after wash, ml | | | 413.12 | |

A 500 milliliter 3-necked round bottomed flask was equipped with a condenser, temperature probe, magnetic stirrer, addition funnel, and heating mantle. Polytail H (46.47 grams, 0.0166 moles), $BF_3 \cdot THF$ (2.013 grams, 0.014 moles), 160 g of benzotrifluoride, was mixed and allowed to stir for 30 minutes at 70° C. A solution of bis FOX monomer from Example M3 (100 grams, 0.10 moles) and Heloxy 61 (0.747 grams, 0.005 moles) in 80 grams of benzotrifluoride was prepared. The monomer solution was added to the reactor over 1 hour. An prepared. The monomer solution was added to the reactor over 1 hour. An exotherm was observed increasing the temperature to 79° C. The reaction was allowed to stir at 75° C. for 2 hours. The reaction was quenched with 43 grams of 5 percent sodium bicarbonate. The organic layer could not be separated, so the solvent was removed under reduced pressure. A yield of 135 grams of statistical oxetane-THF copolymer with a degree of polymerization of 6 was observed. A triblock copolymer with polytail H was formed having the structure (fluorinated bis-oxetane-THF)-Polytail H-(fluorinated bis-oxetane-THF).

During polymerization of the above oxetane monomers with the above noted initiators, various other comonomers can optionally be added to form a copolymer. For example, a variety of comonomers having epoxy (oxirane) functionality can be used such as epichlorohydrin, propylene oxide, ethylene oxide, butyl glycidylether, and perfluorooctyl propylene oxide as well as alkyl substituted oxiranes having from 1 to about 15 or from about 7 to about 12 carbon atoms or mixtures thereof; monomers having a 4-membered cyclic ether group such as trimethylene oxide, 3,3-bis (chloromethyl)oxetane, 3,3-bis(bromomethyl)oxetane, and, 3,3-bromomethyl(methyl)oxetane; monomers having a 5 membered cyclic ether group such as tetrahydrofuran, tetrahydropyran, and 2-methyltetrahydrofuran; and the like. Still other suitable monomers include 1,4-dioxane, 1,3-dioxane and 1,3-dioxalane as well as trioxane and caprolactone. The copolymerization reaction is carried out generally under the same conditions as is the polymerization of the fluorooxetane monomers set forth hereinabove. The amount of the comonomer is from about 0.1 percent to about 55 percent by weight, desirably from about 0.25 percent to about 25 percent or 40 percent by weight, and preferably from about 0.5 percent to about 2 percent, 5 percent, or 10 percent by weight based upon the total weight of the one or more comonomers and the oxetane-$R_f$ monomers.

The block copolymers of the present invention as well as the fluorinated alcohol grafted maleated polyolefin polymers or maleated polymers derived from vinyl substituted aromatic monomers are generally a solid, and have good physical properties such as low surface tension, thermal stability, and stain resistance, and can be utilized as additives to impart favorable properties to polymers such as polyolefins. The polyolefins are generally derived from one or more monomers having from 2 to about 6 or 8 carbon atoms and preferably 2 or 3 carbon atoms such as ethylene, propylene, and the like. Desirably, polyethylene, polypropylene, or copolymers thereof are utilized.

The block copolymers as well as the grafted polyolefins of the present invention can be added in a number of ways to existing polymers such as polyolefins as by melt coextrusion, preparation of a master batch, and the like. For example, (I) a master batch of the block copolymer or the grafted polymers could be prepared by addition of the same to the polyolefin used to make a product such as a fabric. The master batch would then be coextruded with additional polyolefin. The blend would then be processed as any other polyolefin such as in sheet form, annular form such as a hose, fiber formed such as a melt spun fiber, or the like. (II) Alternatively, the block copolymer or the grafted polymers could be added directly by coextrusion to the polyolefin that is to comprise the fiber, sheet, annulus, or the like. The block copolymer or grafted copolymers are typically used in the amount of from about 0.1 to about 5 or 10 parts by weight and desirably from about 0.5 to about 1.5 or 3 parts by weight based upon 100 parts by weight of polyolefin (e.g. a fiber) so that the blended polyolefin has from about 0.1 to about 2 or about 3 weight percent, and desirably from 0.25 to about 0.75 weight percent fluorine based on the total weight of polyolefin.

The invention will be better understood by reference to the following examples and data which serve to illustrate, but not to limit the invention.

Various block copolymers of an oxetane polymer, or copolymer (as with THF) and a polyhydroxyl terminated hydrogenated butadiene polymer was melt blended with polypropylene having a melt index of about 18 in the amounts shown in Tables 1 and 2 and tested.

TABLE 1

Contact Angles on Various Sample Melt Additives in Polypropylene[†]
The triblock copolymer of Sample 1 is made in a manner essentially very similar to Example 1 setforth hereinabove. Samples 2 and 3 are controls of a single polyoxetane block.

| Sample | Structure | Hexadecane Contact Advancing Contact Angle (°) | Weight % Additive |
|---|---|---|---|
| 1 | HO−[CH$_2$−C(CH$_3$)(CH$_2$OCH$_2$CH$_2$(CF$_2$)$_n$F)−CH$_2$−O]$_a$−[[CH$_2$−CH(CH$_2$CH$_3$)]$_x$−[CH$_2$−CH$_2$−CH$_2$−CH$_2$]$_y$]$_z$−[O−CH$_2$−C(CH$_3$)(CH$_2$OCH$_2$CH$_2$(CF$_2$)$_n$F)−CH$_2$]$_b$−OH;  x ≈ 2, y ≈ 8, z ≈ 160, a + b ≈ 6, n ≈ 8 | 34.8 ± 3.3 | 1.21 |
| 2 (Control) | C$_8$H$_{17}$−[O−CH$_2$−C(CH$_3$)(CH$_2$OCH$_2$CH$_2$(CF$_2$)$_n$F)−CH$_2$]$_x$−OH;  x ≈ 4.5, n ≈ 8 | 8.4 ± 4.0 | 0.72 |
| 3 (Control) | C$_8$H$_{17}$−[O−CH$_2$−C(CH$_3$)(CH$_2$OCH$_2$CH$_2$(CF$_2$)$_n$F)−CH$_2$]$_x$−OH;  x ≈ 18, n ≈ 8 | 15.6 ± 0.6 | 0.68 |
| 4 (Control) | A fluorinated melt additive, i.e. FX-1801 from 3M. | 37.5 ± 3.2 | 1.0 |

[†]Samples compounded using Brabender mixer at about 175° C. and then compression molded into plaques. All samples contained 0.375 weight % fluorine based on weight of polypropylene.

TABLE 2

Effect of PolyOxetane Block Length on Contact Angles of Additive in Polypropylene[†]

| Sample | Structure | Hexadecane Contact Advancing Contact Angle (°) | Weight % Additive |
|---|---|---|---|
| 1 | HO−[CH$_2$−C(CH$_3$)(CH$_2$OCH$_2$CH$_2$(CF$_2$)$_n$F)−CH$_2$−O]$_a$−[[CH$_2$−CH(CH$_2$CH$_3$)]$_x$−[CH$_2$−CH$_2$−CH$_2$−CH$_2$]$_y$]$_z$−[O−CH$_2$−C(CH$_3$)(CH$_2$OCH$_2$CH$_2$(CF$_2$)$_n$F)−CH$_2$]$_b$−OH;  x ≈ 2, y ≈ 8, z ≈ 160, a + b ≈ 6, n ≈ 8 | 15.6 ± 0.9 | 1.0 |

TABLE 2-continued

Effect of PolyOxetane Block Length on Contact Angles of Additive in Polypropylene[†]

| Sample | Structure | Hexadecane Contact Advancing Contact Angle (°) | Weight % Additive |
|---|---|---|---|
| 2 | 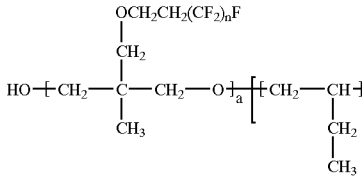<br>x ≈ 2, y ≈ 8, z ≈ 160, a + b ≈ 18.6, n ≈ 8 | 33 ± 3.7 | 1.0 |

Sample 1 was made in a manner essentially similar to that of Example 1 as set forth herein above.

Sample 2 was made in a manner similar to Example 1.

[†]Samples compounded using Brabender mixer at about 175° C. and them compression molded into plaques.

As apparent from Table 1, the present invention, that is Example 1, when tested with regard to contact angle showed vast improvement over Controls 2 and 3 which related to a fluorinated oxetane monol. Example 4 relates to a previously commercially available material from 3M.

Table 2 shows the effect on the contact angle with the length of the polyoxetane block. When the number repeat groups was generally at least 5 or 6 or greater, i.e. Table 1, Example 1 and Table 2 Example 2, high contact angles, i.e. in excess of 20, 25, or 30, were obtained.

Another aspect of the present invention relates to grafting the above fluorinated aliphatic or alkyl alcohols such as those exemplified by Formula A onto existing polyolefins or polymerized vinyl substituted aromatics monomers which have been maleated. The polyolefins are derived from olefin monomers having from 2 to 8 carbon atoms with 2 or 3 carbon atoms being preferred or a copolymer of poly(ethylene-propylene)copolymer being preferred. The preparation of such maleated polyolefins which have a plurality of maleated sites are well known to the literature as well as those skilled in the art and are commercially available such as from ExxonMobil Chemical as Exxelor. The vinyl substituted aromatic monomers contain from about 8 to about 12 carbon atoms with specific examples including styrene, α-methylstyrene, and the like with styrene being preferred. Polymers therefrom can also be maleated in a manner well known to the literature as well as to the art and also contain a plurality of maleated sites.

The above noted fluorinated alcohols such as set forth in Formula A wherein $R_f$ of a plurality of alcohols, independently, can be either the same or different, are initially reacted with an amino dicarboxcylic acid having a total of from about 3 to about 15 carbon atoms and desirably from about 4 to about 6 carbon atoms and from 1 to 3 amino groups and preferably 1 amino group. Examples of such acids include glutamic acid, aspartic acid and the like. The amino acids are reactive with the fluorinated alcohols in the present of a small amount of hydrocarbon solvents such as the various alkanes having from about 6 to about 8 carbon atoms such as hexane, heptane and the like. The reaction temperature is from about 150° C. to about 210° C. and desirably from about 170° C. to about 190° C. in the presence of a Lewis acid catalyst such as tetrabutyl titanate, e.g. Tyzor TBT made by DuPont. Various convention tin catalysts as well as hydrochloric acid can also be utilized. A condensation reaction is conducted with water being collected.

The following example relates to the reaction between Glutamic Acid and Cheminox fa-8.

EXAMPLE A

| Substance | Weight G | MW | mmoles |
|---|---|---|---|
| Cheminox fa-8 | 50 | 461.1 | 108.44 |
| Tyzor TBT | 0.025 | 340 | 7.35E-05 |
| Heptane | 5 | 100.21 | 49.90 |
| Glutamic acid | 15.95 | 147.13 | 108.44 |

A 3-necked round bottomed flask was equipped with a temperature probe, condenser equipped with a dean stark trap, magnetic stirrer, and a heating mantle. Cheminox fa-8 (50 grams, 108.44 mmoles), Tyzor TBT catalyst (0.025 grams), heptane, (5 grams) and Glutamic acid (15.95 grams, 108.44 mmoles) were added. The reaction was heated with stirring to 180° C., and the water and heptane were distilled into the dean stark trap. The reaction was followed with proton-NMR for the disappearance of the OH group. After 5 hours the reaction reached a conversion of 90 percent, and the reaction was stopped. ~60 grams of glutamic acid ester was isolated.

The fluorinated alcohol functionalized amino dicarboxcylic acids are subsequently grafted onto the maleated polyolefin or the maleated polymer derived from vinyl substituted aromatic monomers. The reaction is generally simply carried out at temperatures of from about 175° C. to about 225° C. and desirably from about 190° C. to about 210° C. An amount of the amino dicarboxylic acid utilized is sufficient to graft generally at least 50 percent, desirably at least 70 percent, and preferably at least 90 percent of the maleated sites. Subsequently, the grafted copolymers can be blended with polyolefins having an Aristech D180M melt index of from about 15 to about 50.

The following example illustrates the grafting reaction and imidization of the maleated polyolefin.

EXAMPLE B

A brabender mixer was heated to 175° C. and Exxelor PO 1015 maleated polypropylene was added (6.87 grams). The temperature was increased to 200° C., and Glutamic acid functionalized Cheminox fa-8 (0.42 grams) from Example A was added, and mixed for 5 minutes. The temperature was decreased to 175° C., and a maleated polypropylene having an Aristech D180M 18 melt index was added and mixed for 5 more minutes. The mixed polymer was removed from the brabender and molded into a flat sheet at 10,000 psi pressure while still hot. The grafted polypropylene mixture was then molded into a thinner sheet between metal plates at 180° C., and 10,000 PSI pressure.

The blended polyolefins which contain the block copolymers or graft copolymers of the present invention therein can be utilized in a variety of applications or end uses such as in sheet form, as individual fibers, as fibers which are subsequently utilized as a non-woven or woven fabrics made from such fibers, for example carpets, awnings, tents, and the like. Other uses include furniture, especially outdoor, fencing, and the like.

The solid melt additive process of the present invention has a number of advantages over topical application of water-borne fluorochemicals; especially for treatment of polyolefin materials: (I) There is no water used in process and, therefore, none to remove. This could eliminate substantial energy and time costs associated with removal of water. (II) Many polymers are processed into fibers normally by extrusion and melt spinning. Materials such as antioxidants, colorants and processing aids, are often added to the melt during production into fiber. The addition of a block copolymer at this stage would not add any unit operations to fiber production. (III) No surface tension-lowering surfactants are necessary to wet the fabric or fiber. The fluorinated block copolymer "wetting" of the fiber surface occurs unaided during processing of fiber. The fluorinated block copolymer tends to exude by a diffusive process to the outer regions of the fiber where a mixture of the block copolymer and the polyolefin exists.

While in accordance with patent statures the best mode and preferred embodiment have been set forth, the scope of the invention is not limited thereto, but rather by the scope of the attached claims.

What is claimed is:

1. A block copolymer comprising:
a first block having repeat units that include pendant ether groups having a terminal fluorinated group, and
a second block having hydrocarbon repeat units, where the first block is connected to the second block via an ether linkage.

2. The block copolymer of claim 1, where the first block has repeat units defined by one or both of the formulae

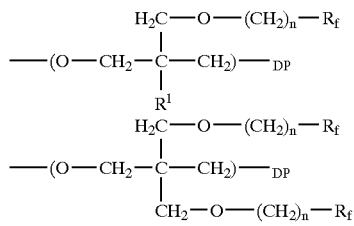

where $R^I$ is an alkyl group having from 1 to 6 carbon atoms, n is independently an integer from 1 to 6, $R_f$ is a fluorinated group, and DP, which represents the number of repeat units within said first block, is an integer from 2 to about 100.

3. The block copolymer of claim 2, where the number of repeat units (DP) within said first block is from 3 to about 50.

4. The block copolymer of claim 2, where $R_f$ is the same for each repeat unit within said first block and is a fluorinated aliphatic group containing from 1 to about 20 carbon atoms.

5. The block copolymer of claim 2, where the repeat units within said first block include at least two different fluorinated aliphatic groups containing from 2 to about 30 carbon atoms.

6. The block copolymer of claim 4, where the fluorinated aliphatic groups are characterized by having at least 50% of the available hydrogen atoms replaced by fluorine.

7. The block copolymer of claim 5, where the fluorinated aliphatic groups are characterized by having at least 50% of the available hydrogen atoms replaced by fluorine.

8. The block copolymer of claim 4, where the fluorinated aliphatic groups are characterized by having at least 95% of the available hydrogen atoms replaced by fluorine.

9. The block copolymer of claim 5, where the fluorinated aliphatic groups are characterized by having at least 95% of the available hydrogen atoms replaced by fluorine.

10. The block copolymer of claim 1, where said first block includes at least one repeat unit derived from an oxirane, a 4-membered cyclic ether, a 5-membered cyclic ether group, 1,4-dioxane, 1,3-dioxane, 1,3-dioxalane, trioxane, caprolactone, or combinations thereof.

11. The block copolymer of claim 1, where said second block comprises an olefin polymer or copolymer derived from at least one olefin monomer having from 2 to about 8 carbon atoms or a hydrogenated diene polymer or copolymer derived from at least one conjugated diene monomer having from 4 to about 10 carbon atoms.

12. The block copolymer of claim 2, wherein when said $R_f$ is different, said different $R_f$ groups, independently, is an alkyl having from 4 to 24 carbon atoms, wherein when said $R_f$ is the same said $R_f$ is an alkyl having from 3 to about 15 carbon atoms, and wherein said $R_f$ groups, independently, contain at least 75 percent of the alkyl hydrogen atoms replaced by a fluorine atom.

13. The block copolymer of claim 12, wherein n, independently, is from 1 to about 4, wherein DP is from about 3 to about 50, wherein said second block is an olefin block having a number average molecular weight of from about 200 to about 4,000 or a hydrogenated diene block polymer or copolymer having a number average molecular weight of from about 500 to about 15,000.

14. The block copolymer of claim 13, wherein said $R_f$ groups, independently, contain at least 90 percent of the hydrogen atoms replaced by a fluorine atom, and wherein said olefin block polymer or copolymer is derived from olefin monomers having 2 or 3 carbon atoms.

15. The block copolymer of claim 14, wherein n, independently, is 1 or 2, wherein $R^I$ is hydrogen or methyl, and wherein said $R_f$ is different, independently, the number of carbon atoms therein is from about 6 to about 20.

16. The block copolymer of claim 15, wherein said DP is from about 3 or about 4 to about 10 or about 20, wherein said second block connected to said first block is said hydrogenated diene block polymer or copolymer having a number average molecular weight of from about 1,000 to about 8,000.

17. The block copolymer of claim 11, wherein said hydrogenated butadiene block copolymer has the structure

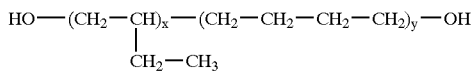

wherein the ratio of said x group to said y groups is from about 0.10 to about 10, including said at least one optional repeat unit and wherein said repeat unit is derived from tetrahydrofuran.

18. The block copolymer of claim 17, wherein said $R_f$ is perfluorinated.

19. A polymeric composition comprising a blend of a polyolefin and the block copolymer of claim 1.

20. A polymeric composition comprising a blend of a polyolefin and the block copolymer of claim 13, wherein said polyolefin is derived from one or more olefin monomers having from 2 to 6 carbon atoms.

21. A polymeric composition comprising a blend of a polyolefin and from about 0.1 to about 10 parts by weight of the block copolymer of claim 15 per 100 parts by weight of the polyolefin, and wherein said polyolefin is derived from an olefin monomer having 2 or 3 carbon atoms, or combinations thereof.

22. A polymeric composition comprising a blend of a polyolefin and from about 0.5 to about 3.0 parts by weight of the block copolymer of claim 17 per 100 parts by weight of the polyolefin, and wherein said polyolefin is derived from an olefin monomer having 2 or 3 carbon atoms, or combinations thereof.

23. A fiber comprising a blend of a polyolefin and the block copolymer of claim 1.

24. A fiber comprising a blend of a polyolefin and the block copolymer of claim 13, wherein said polyolefin is derived from one or more olefin monomers having from 2 to 6 carbon atoms.

25. A fiber comprising a blend of a polyolefin and from about 0.1 to about 10 parts by weight of the block copolymer of claim 15 per 100 parts by weight of the polyolefin, and wherein said polyolefin is derived from an olefin monomer having 2 or 3 carbon atoms, or combinations thereof.

26. A fiber comprising a blend of a polyolefin and from about 0.5 to about 3.0 parts by weight of the block copolymer of claim 17 per 100 parts by weight of the polyolefin and wherein said polyolefin, is derived from an olefin monomer having 2 or 3 carbon atoms, or combinations thereof.

27. A fabric comprising a fiber of claim 23.
28. A fabric comprising a fiber of claim 24.
29. A fabric comprising a fiber of claim 25.
30. A block copolymer composition, comprising:
the reaction product of a plurality of oxetane monomers having the formula

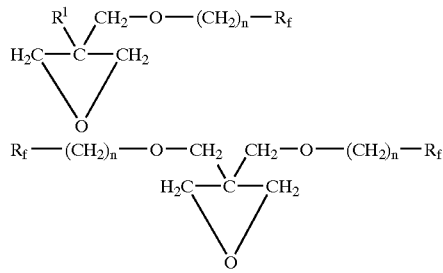

where $R^1$ is hydrogen or an alkyl having from 1 to 6 carbon atoms, n, independently, is from 1 to 6, and wherein $R_f$ is a) the same for each monomer of Formula 1A or Formula 1B and is a fluorinated aliphatic having from 1 to about 20 carbon atoms, or b) at least two different fluorinated aliphatics having said Formula 1A or Formula 1B and, independently, has from about 2 to about 30 carbon atoms, with a mono or polyhydroxyl terminated hydrocarbon polymer comprising: an olefin polymer or copolymer derived from at least one olefin monomer having from 2 to about 8 carbon atoms; or a hydrogenated diene polymer or copolymer derived from at least one conjugated diene monomer having from 4 to about 10 carbon atoms.

31. A block copolymer composition according to claim 30, wherein when said $R_f$ is different said different $R_f$ groups, independently, is an alkyl having from 4 to 24 carbon atoms, wherein when said $R_f$ is the same said same $R_f$ is an alkyl having from 3 to about 15 carbon atoms, and wherein said $R_f$, independently, contain at least 75 percent of said alkyl hydrogen atoms replaced by a fluorine atom.

32. A block copolymer composition according to claim 31, wherein at least 75 percent of the hydrogen atoms of said $R_f$ alkyl group is replaced by a fluorine atom.

33. A block copolymer composition according to claim 32, wherein n, independently, is 1 or 2, wherein $R^1$ is hydrogen or methyl, and wherein when said $R_f$ is different, independently, the number of carbon atoms therein is from about 6 to about 20, and wherein said hydrogen carbon polymer is said hydrogenated butadiene block copolymer and has the structure

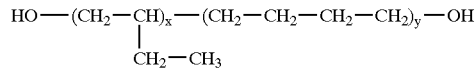

wherein the ratio of said x group to said y groups is from about 0.10 to about 10.

34. A block copolymer composition according to claim 33, wherein said reaction product is a diblock or a triblock copolymer, wherein said hydrogenated diene block copolymer has a number average molecular weight of from about 1,000 to about 8,000.

35. A block copolymer composition according to claim 34, wherein said $R_f$ is perfluorinated, and wherein x of said hydrogenated butadiene block copolymer is about 2 and wherein said y is about 8.

36. A block copolymer prepared by a process comprising polymerizing at least one type of oxetane monomer in the presence of a hydroxyl-terminated polymer to provide the block copolymer, where the oxetane monomer includes pendent ether groups that include, at the terminal portion thereof, a fluorinated aliphatic group.

37. The block copolymer of claim 36, where the hydroxyl-terminated polymer is a hydroxyl-terminated polyolefin or a hydroxyl-terminated hydrogenated polydiene.

38. The block copolymer of claim 37, where by hydroxyl-terminated polymer is a poly hydroxyl-terminated polymer.

39. The block copolymer of claim 36, where the oxetane monomer includes pendant ether groups, and where the terminal portion of the ether group is a perfluorinated group, where the fluorinated aliphatic group is a perfluorinated group.

40. The block copolymer of claim 36, where said step of polymerizing the oxetane monomer takes place in the presence of a catalyst.

41. The block copolymer of claim 40, where the catalyst includes boron trifluoride.

42. The block copolymer of claim 2, where $R_f$ is a perfluorinated group.

43. The block copolymer of claim 36, where the fluorinated aliphatic group is characterized by having at least 95% of the available hydrogen atoms replaced by fluorine.

* * * * *